US008433760B2

(12) United States Patent
Ganapathy et al.

(10) Patent No.: US 8,433,760 B2
(45) Date of Patent: Apr. 30, 2013

(54) INTER-NODE COMMUNICATION SCHEME FOR NODE STATUS SHARING

(75) Inventors: Arunachalam Ganapathy, Bangalore (IN); Rajeev Mishra, Bangalore (IN); Lance W. Russell, Austin, TX (US); Murali Vaddagiri, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 12/959,581

(22) Filed: Dec. 3, 2010

(65) Prior Publication Data

US 2012/0143957 A1 Jun. 7, 2012

(51) Int. Cl.
*G06F 15/16* (2006.01)
(52) U.S. Cl.
USPC ........... 709/205; 709/465; 709/224; 709/202; 370/216; 370/248; 370/236
(58) Field of Classification Search .................. 709/205, 709/465, 224, 202; 370/216, 248, 236, 338
See application file for complete search history.

(56) References Cited

U.S. PATENT DOCUMENTS

| 5,764,913 | A | * | 6/1998 | Jancke et al. ............... 709/224 |
|---|---|---|---|---|
| 6,031,817 | A | | 2/2000 | Moy |
| 6,411,967 | B1 | | 6/2002 | Van Renesse |
| 6,591,317 | B1 | | 7/2003 | Schzukin et al. |
| 6,983,324 | B1 | | 1/2006 | Block et al. |
| 7,058,957 | B1 | | 6/2006 | Nguyen |
| 7,451,359 | B1 | | 11/2008 | Coekaerts |
| 7,539,755 | B2 | | 5/2009 | Li et al. |
| 7,590,898 | B2 | | 9/2009 | Coekaerts |
| 7,624,194 | B2 | | 11/2009 | Kakivaya et al. |
| 7,738,364 | B2 | | 6/2010 | Bain |
| 8,161,053 | B1 | | 4/2012 | Khan et al. |
| 2003/0061340 | A1 | | 3/2003 | Sun et al. |
| 2003/0105850 | A1 | | 6/2003 | Lean et al. |
| 2003/0233594 | A1 | * | 12/2003 | Earl ................................ 714/4 |
| 2006/0050629 | A1 | * | 3/2006 | Saika ........................ 370/216 |
| 2007/0041328 | A1 | * | 2/2007 | Bell ............................ 370/248 |
| 2009/0070617 | A1 | | 3/2009 | Arimilli |
| 2010/0115338 | A1 | | 5/2010 | Rao et al. |

FOREIGN PATENT DOCUMENTS

WO   WO2004031979 A2   4/2004

OTHER PUBLICATIONS

Van Renesse, et al., "A gossip-style failure detection service", Proceedings of the IFIP International Conference on Distributed Systems Platforms and Open Distributed Processing, 2009, Springer Verlag, Illinois.

* cited by examiner

*Primary Examiner* — Chi Pham
*Assistant Examiner* — Fahmida Chowdhury
(74) *Attorney, Agent, or Firm* — Mitch Harris, Atty at Law, LLC; Andrew M. Harris; Matthew W. Baca

(57) ABSTRACT

A gossiping scheme for sharing node status in a cluster of nodes provides a robust mechanism for determining node status within the cluster. Nodes transmit gossip messages to each other nodes, the gossip messages listing other nodes in the cluster that are operational. When a node does not receive a gossip message from a particular node within a predetermined time period, then the node transmits messages to the other nodes indicating that the particular node is down. However, if another node has received a packet from the particular node within the predetermined time period and receives the node down message, then the other node responds with a node alive message.

14 Claims, 5 Drawing Sheets

INTER-NODE COMMUNICATION SCHEME FOR NODE STATUS SHARING

CROSS-REFERENCE TO RELATED APPLICATIONS

The present U.S. patent application is related to co-pending U.S. patent applications Ser. No. 12/959,568 entitled "DYNAMIC RATE HEARTBEATING FOR INTER-NODE STATUS UPDATING" and Ser. No. 12/959,556 entitled "ENDPOINT-TO-ENDPOINT COMMUNICATIONS STATUS MONITORING" filed contemporaneously herewith and having at least one common inventor and assigned to the same Assignee, the disclosures of which are incorporated herein by reference.

BACKGROUND

1. Field of the Invention

The present invention is related to node status monitoring in distributed computing systems, and more specifically to a scheme of node status sharing by gossiping among the nodes.

2. Description of Related Art

In large-scale distributed computer systems, such as those using distributed software models to perform tasks, multiple nodes provide independent execution of sub-tasks. In order to keep such a system operational, and further, to provide for proper operation of distributed applications that use the multiple nodes to perform various tasks, the status of nodes is tracked. In particular, in order to assign tasks to nodes, and in order to ensure that a node is available to communicate with to perform a task, the operational status of the nodes and their ability to communicate with the other nodes must be monitored.

Communications and status monitoring is typically centralized, with a monitoring application providing information about node and interface status. The monitoring application may use distributed agents to perform the monitoring on each node. Heartbeat messages are typically sent from the nodes to a centralized manager that maintains a record of the status of each node.

BRIEF SUMMARY

The invention provides a node status monitoring system and method that is embodied in a computer program product and computer systems. The computer program product and computer system communicate node status information among the nodes by gossiping, eliminating the need for a central clearinghouse or monitoring facility.

The computer program product and computer system determine node operating status among a cluster of nodes of a computer system by transmitting gossip messages directly between node pairs in the cluster. The gossip messages include an indication of other nodes in the cluster of nodes that are operational. When a node has not received a gossip message from another node for a predetermined period of time, the, the local status for the other node is set to non-operational, and a message indicating that the other node is down is sent to each of the other nodes in the cluster. If another node has received a status message within the predetermined period of time and receives the node down message, then the other node sends a node alive message to the other nodes.

The foregoing and other objectives, features, and advantages of the invention will be apparent from the following, more particular, description of the preferred embodiments of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION

The present invention encompasses techniques for monitoring communication status in clusters of nodes within distributed computing systems. In particular, embodiments of the invention provide determining the operational status of the nodes in the cluster by sending gossiping messages between the nodes, containing indications of the status of other nodes. When a node has not received a gossip message from a particular node for a predetermined time period, the node sends a message that the particular node is down. If another node has received a gossip message from the particular node in the predetermined time period, that other node sends a message to the other nodes indicating that the particular node is alive. Thus, the present invention provides a self-correcting and robust node status information sharing system. Other features that may be incorporated in the gossiping methodology will be described in further detail below.

Figure 1:
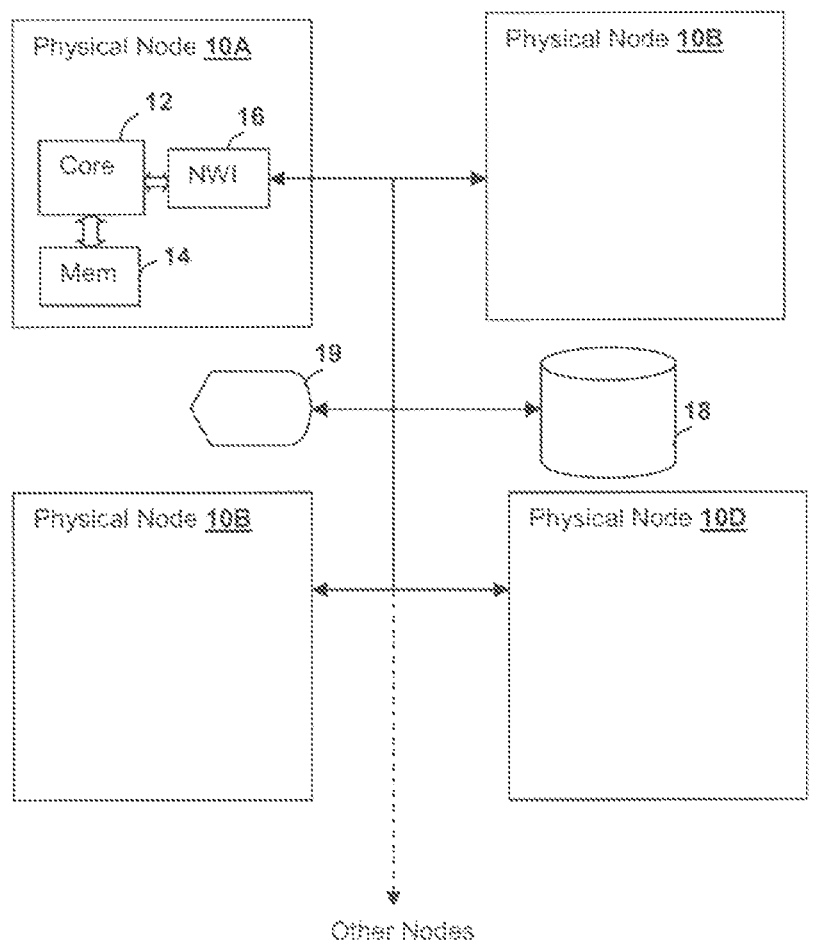
FIG. 1 is a block diagram of a distributed computer system in which techniques according to an embodiment of the present invention are practiced.

Referring now to FIG. 1, a distributed computer system in accordance with an embodiment of the present invention is shown. A first physical processing node 10A includes a processor core 12 coupled to a memory 14 that stores program instructions for execution by processor 12. The program instructions include program instructions forming computer program products in accordance with embodiments of the invention that provide node status information for either physical processing nodes 10A-10D, virtual processing nodes partitioned within the depicted computer system as will be described in further detail below, or both. Processing node 10A also includes a network interface (NWI) 16 that couples processing node 10A to a wired, wireless or hybrid network, which may be a standardized network such as Ethernet, or a proprietary network or interconnect bus. Other processing nodes 10B-10D are of identical construction in the exemplary embodiment, but embodiments of the invention may be practiced in asymmetric distributed systems having nodes with differing features. Although only four compute nodes 10A-10D are illustrated, a distributed computer system in accordance with an embodiment of the present invention will generally include a large number of compute nodes connected via one or more networks. The distributed computer system of FIG. 1 also includes other resources such as I/O devices 19, including graphical display devices, printers, scanners, keyboards, mice, which may be coupled to the network or one of nodes 10A-10D via workstation computers that provide a user interface to administrative personnel and other users. Nodes 10A-10D are also coupled to storage devices 18, for storing and retrieving data and program instructions, such as storing computer program products in accordance with an embodiment of the invention.

Figure 2:
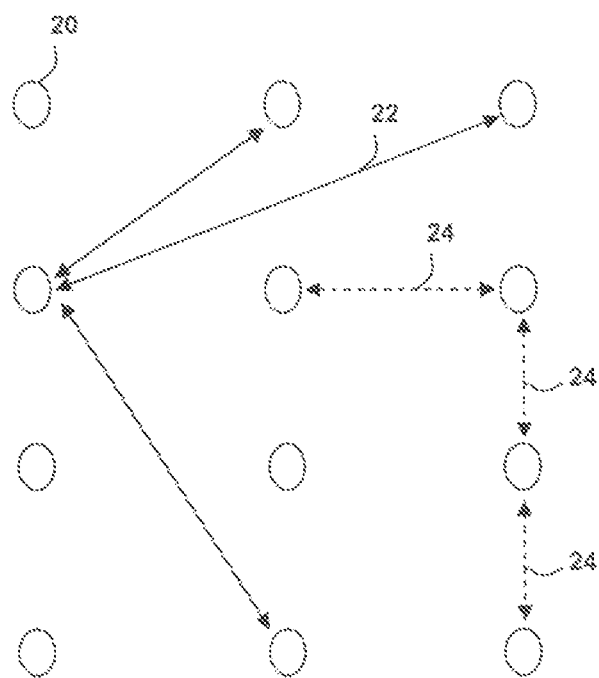
FIG. 2 is a pictorial diagram depicting communication between nodes of a computer system in accordance with an embodiment of the present invention.

Referring now to FIG. 2, communication between multiple nodes 20 of the distributed computer system of FIG. 1 is shown. As mentioned above, nodes 20 may correspond exactly on a one-to-one basis with processing nodes 10A-10D (and other nodes) of FIG. 1, or nodes 20 may be partitioned in a different manner as virtual processing nodes. For example, a single node 20 may have exclusive use of multiple processing nodes, e.g. nodes 10A-10B, and result in a system having a greater number of virtual nodes than processing nodes, or alternatively, multiple nodes 20 may be implemented on a single processing node, e.g., node 10A. In the present invention, each of nodes 20 represents at least one operating system image and one or more applications executing within the operating system image. In general, the entire system as depicted may execute a single application, but sub-tasks within the application are apportioned to the various nodes 20, which may be identical sub-tasks or different sub-tasks. The present invention concerns node status monitoring and communications of node status among nodes within the computer system of FIG. 1. Gossip messages and other node status command messages are communicated between nodes 20 and the messages are processed at each node. Operational messages are also passed between nodes 20, including data and program code transmissions. Nodes are generally arranged in a cluster, which is a group of virtual or physical processing nodes organized to perform a particular task or group of tasks, e.g., for a particular customer. As illustrated, communication between nodes in a cluster may be accomplished by direct node to node communications 22 or by next-neighbor communications 24 in which nodes 20 pass along messages to other nodes 20. While the description of the particular embodiments oldie invention below describes the node status and gossip communications taking place node-to-node as opposed to from nodes to a centralized status facility, it is understood that node-to-node communications do not require that the transmissions take place over a physical network that does not traverse other nodes, and the next-neighbor communications 24 can be used to implement node-to-node communications. Further, as alternative to the illustrated communications is to use a central facility for inter-node communication, which is distinct from centrally reporting and acting on node status indications. Therefore, the present invention may encompass techniques that use a centralized communication point, such as a star arrangement, while still passing gossip messages in a node-to-node manner with respect to the messaging endpoints. However, since the illustrated embodiment provides a de-centralized communications monitoring system, it is generally preferable not to use a central exchange for messaging.

Figure 3A:
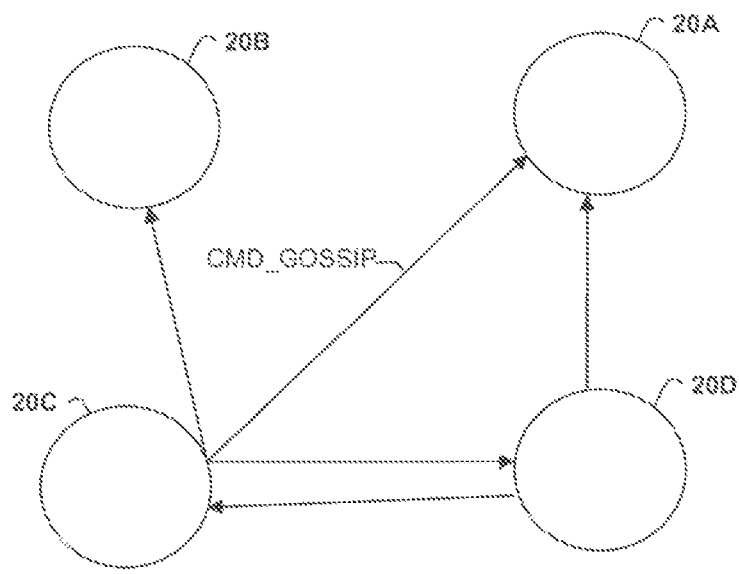
FIGS. 3A-3C are pictorial diagrams showing communications in a gossiping scheme in accordance with an embodiment of the present invention.
Figure 3B:
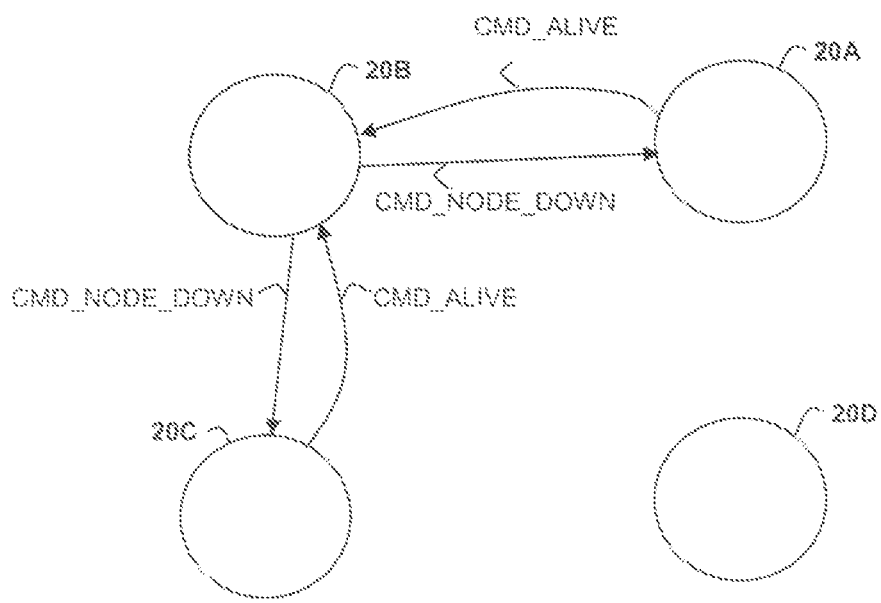
Figure 3C:
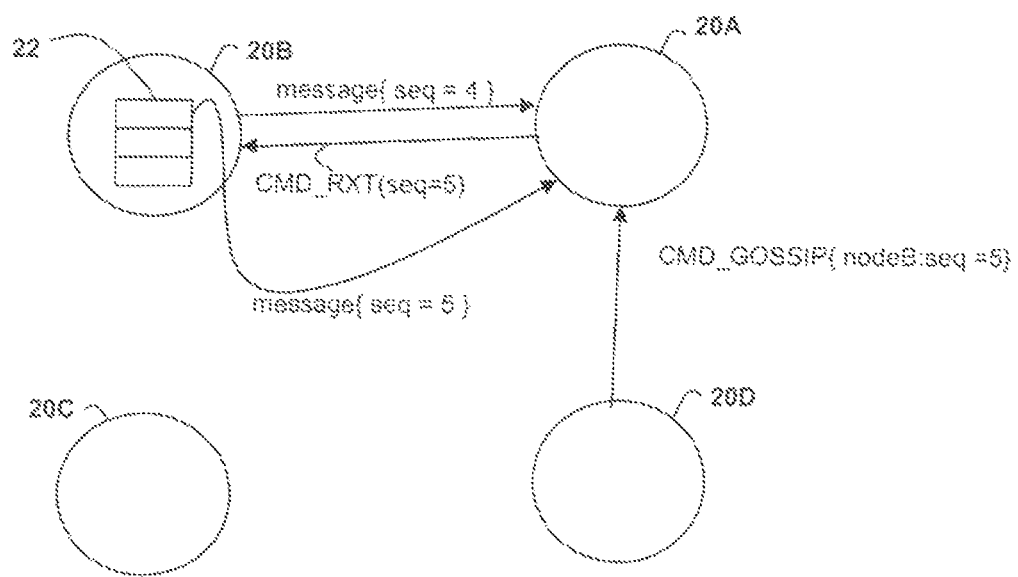

Referring now to FIGS. 3A-3C, a node status methodology in accordance with an embodiment of the invention is illustrated. In the illustrated embodiment, four special messages are used to perform the status monitoring:

```
CMD_GOSSIP{ <node, seq#>, <node, seq#> ...<node, seq#>, }
CMD_NODE_DOWN{ node }
CMD_ALIVE{ node }
CMD_RXT{node, seq#}
```

Gossip message CMD_GOSSIP is transmitted between all of the node pairs on a regular basis within the cluster of nodes. For each node that has an operational status at the transmitting node, the node number and the sequence number of the most recently received reliable, i.e., operational, transmission are inserted in the message data. The gossip message itself is not considered a reliable transmission, as the gossip messages form part of the status monitoring, so the sequence number represents the last actual operational transmission from the specified node. When a node receives a gossip message from another node, the node numbers and sequence numbers provided from the other node are used to update a local database, which may be a table, that contains the status and message sequence number information for the other nodes, as well as an indication of the time elapsed since the node has received a gossip message from each other node. There are essentially two checks in this scheme: first, the nodes expect to receive, and time the reception of, gossip messages from each other node in the cluster; and second, the nodes receive information about all nodes in the cluster and their most recently received operational messages from each other node in the cluster, providing a very robust status sharing methodology. FIG. 3A illustrates transmission of gossip messages CMD_GOSSIP from nodes 20C and 201) to the other nodes. Nodes 20A and 20B also transmit gossip messages, but those have been omitted from the illustration for clarity. In FIG. 3A node 20D is shown as not transmitting a gossip message to node 20B, for example due to loss of a suitable route, or a hardware failure. The lack of transmission of a gossip message to node 20B from node 20D will be used to illustrate the other messages and techniques of the present invention with reference to FIGS. 3B-3C below.

Node status message CMD_NODE_DOWN is transmitted from a node to all other nodes in the cluster when a node determines that a gossip message has not been received from a particular node for a predetermined time period. The time period may be determined from a timer, a comparison of a time count to a stored timestamp corresponding to the particular node, a count of gossip message intervals determined from gossip messages received from other nodes (other than the particular node), or other suitable technique for determining that too much time has passed since the last gossip message from the particular node in question. In FIG. 38, node 20B eventually determines, due to the lack of transmissions of gossip messages from node 20D as illustrated in FIG. 3A, and albeit erroneously, that node 20B is non-operational. Node 20B then transmits node status messages CMD_NODE_DOWN containing the node number of node 208, to nodes 20A and 20C. When nodes 20A and 20C receive the node status messages CMD_NODE_DOWN from node 208, nodes 20A and 20C transmit node status message CMD_ALIVE containing the node number of node 208, which causes node 20D to correct the node status for node 20B and may trigger additional action such as forming a new route between node 208 and 201) to re-establish communications. If a node actually is down (i.e., the other nodes do not receive gossip messages at all from that node), then the nodes stop including the node marked as down in the gossip messages.

Message CMD_RXT is used to obtain operational messages from another node that were somehow missed. Each node retains operational messages in retransmit queues, one for each other node in the cluster. The entries in the retransmit queues are only removed when their sequence numbers have been indicated in gossip messages as having been received by each node in the cluster. Since each gossip message contains sequence numbers for each node, each gossip message causes the latest sequence number for each node to be updated. If the sequence number changes for a node, the corresponding retransmit queue is inspected and entries are removed up to and including the message indicated by the newly entered sequence number. Thus, message CMD_RXT and the data retention in queues at each node provide an acknowledgement system that ensures that at least temporary communications errors are recoverable. FIG. 3C illustrates node 20A receiving a gossip message that node B (corresponding to node 20B) has received operational message with sequence number 5. Node 20A has not received the message with sequence number 5 only the message with sequence number 4, and so node 20A sends a retransmit message CMD_RXT to node 20B with sequence number 5. Node 20B responds with a copy of message with sequence number 5 from the one of retransmit queues 22 that corresponds to node 20A.

Figure 4:
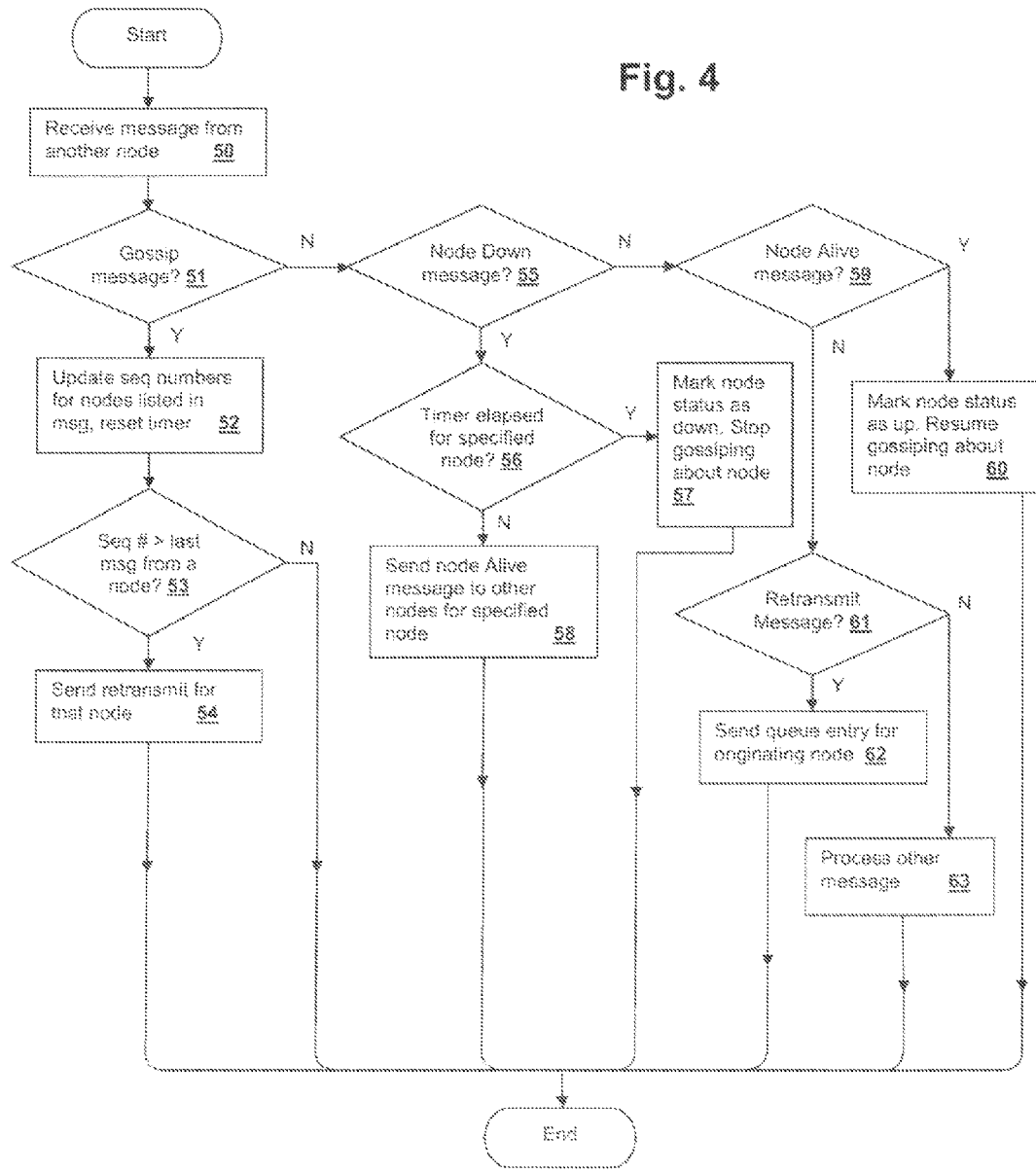
FIG. 4 is a flowchart of a method in accordance with an embodiment of the present invention.

Referring now to FIG. 4, a node status monitoring method in accordance with an embodiment of the present invention is illustrated. A node receives a message from another node (step 50). If the message is a gossip message (decision 51), the sequence numbers for the nodes are updated in the local database/table and the timer for the originating node is reset (step 52). If a sequence number for a node is greater than the last reliable message received from the node (decision 53) then a retransmit request is sent to that node (step 54), in order to obtain the missed reliable transmission. If the message is instead a node down message (decision 55), if the timer has elapsed for the specified node (decision 56) then the status of the node is marked as down and the node is removed from further gossip messages (step 57). Otherwise, if the tinier has not elapsed for the specified node (decision 56), then a node alive message is sent to the other nodes for the specified node (step 58). If the message is instead a node alive message (decision 59), then the status of the specified node is marked as up (operational) and the node resumes including the specified node in gossip messages (step 60). If the message is a retransmit message (decision 61), then the queue entry for the originating node is re-transmitted (step 62). Otherwise, if the message is a reliable (operational) message it is processed (step 63). The illustrated method is the information flow for message processing. Not illustrated is the handling of elapsing gossip message timers, which can be performed synchronously with message processing or asynchronously. If the timer elapses for a node, its local status is marked as down and a node status down message is transmitted.

As noted above, the present invention may be embodied as a system, method, and/or a computer program product. A computer program product may be embodied in firmware, an image in system memory or another memory/cache, stored on a fixed or re-writable media such as an optical disc having computer-readable code stored thereon. Any combination of one or more computer readable medium(s) may be used to store the program instructions in accordance with an embodiment of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present application, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A computer system comprising a processing cluster including a plurality of physical or virtual processing nodes, the computer system comprising at least one processor for executing program instructions and at least one memory coupled to the processor for executing the program instructions, wherein the program instructions are program instructions for determining node operating status among a cluster of the physical or virtual processing nodes, the program instructions comprising program instructions for:
   first transmitting gossip messages directly between node pairs in the cluster of nodes, wherein the gossip messages contain an indication of operational status of other nodes in the cluster of nodes, wherein the other nodes are nodes other than the nodes in the node pairs;
   receiving the gossip messages at the node pairs;
   responsive to the receiving, at the individual nodes, locally updating a local operating status of the other nodes according to the received gossip messages, wherein the local status kept by the individual nodes indicates the status of a particular one of the other nodes as a non-operating status if the receiving by the individual nodes has not received a gossip message from the particular one of the other nodes during a predetermined time period;
   responsive to setting the local status of the particular one of the other nodes as kept by the individual nodes to a non-operating status, second transmitting a node down message indicating the non-operating status of the particular node to the other nodes in the cluster, and
   repeating the first transmitting, receiving, updating and second transmitting at each of the nodes in the node pairs, so that the local status kept by each of the nodes reflects the status of each of the other nodes in the cluster.

2. The computer system of claim 1, wherein the program instructions further comprise program instructions for:
   at a first node other than the particular node, receiving the node down message;

responsive to receiving the node down message, determining whether or not the first node has received a gossip message from the particular node during the predetermined time period; and responsive to determining that the first node has received the gossip message from the particular node during the predetermined time period, transmitting a node alive message from the first node indicating that the particular node is operating.

3. The computer system of claim 2, wherein the program instructions for transmitting the node alive message transmit the node alive message to multiple nodes in the cluster.

4. The computer system of claim 2, further comprising program instructions for, at a second node, receiving the node alive message from the first node, wherein the program instructions for updating, responsive to the receiving the node alive message from the first node, set the status of the particular node at the second node to an operating status.

5. The computer system of claim 1, wherein the gossip messages contain sequence numbers of the most recent transmission received from the other nodes, and wherein the program instructions for updating update the sequence numbers in a local storage.

6. The computer system of claim 5, further comprising program instructions for:

responsive to receiving at a first node a particular gossip message containing a first sequence number associated with a second node, determining whether the first sequence number is greater than a second sequence number of the most recently received message from the second node; and responsive to determining that the first sequence number is greater than the second sequence number, transmitting a retransmit command to the second node.

7. The computer system of claim 1, wherein the program instructions for first transmitting transmit gossip messages containing indications of operational status for nodes having an operational status set as operating at the nodes originating the gossip messages.

8. A computer program product comprising a computer-readable storage media that is not a signal, the storage media storing program instructions for execution within a computer system, the computer system comprising a processing cluster including a plurality of physical or virtual processing modes, wherein the program instructions are program instructions for determining node operating status among a cluster of the physical or virtual processing nodes, the program instructions comprising program instructions for:

first transmitting gossip messages directly between node pairs in the cluster of nodes, wherein the gossip messages contain an indication of operational status of other nodes in the cluster of nodes, wherein the other nodes are nodes other than the nodes in the node pairs;

receiving the gossip messages at the node pairs;

responsive to the receiving, at the individual nodes, locally updating a local operating status of the other nodes according to the received gossip messages, wherein the local status kept by the individual node indicates the status of a particular one of the other nodes as a non-operating status if the receiving by the individual nodes has not received a gossip message from the particular one of the other nodes during a predetermined time period;

responsive to setting the local status of the particular one of the other nodes as kept by the individual nodes to a non-operating status, second transmitting a node down message indicating the non-operating status of the particular node to the other nodes in the cluster; and repeating the first transmitting, receiving, updating and second transmitting at each of the nodes in the node pairs, so that the local status kept by each of the nodes reflects the status of each of the other nodes in the cluster.

9. The computer program product of claim 8, wherein the program instructions further comprise program instructions for:

at a first node other than the particular node, receiving the node down message;

responsive to receiving the node down message, determining whether or not the first node has received a gossip message from the particular node during the predetermined time period; and responsive to determining that the first node has received the gossip message from the particular node during the predetermined time period, transmitting a node alive message from the first node indicating that the particular node is operating.

10. The computer program product of claim 9, wherein the program instructions for transmitting the node alive message transmit the node alive message to multiple nodes in the cluster.

11. The computer program product of claim 9, further comprising program instructions for, at a second node, receiving the node alive message from the first node, wherein the program instructions for updating, responsive to the receiving the node alive message from the first node, set the status of the particular node at the second node to an operating status.

12. The computer program product of claim 8, wherein the gossip messages contain sequence numbers of the most recent transmission received from the other nodes, and wherein the program instructions for updating update the sequence numbers in a local storage.

13. The computer program product of claim 12, further comprising program instructions for:

responsive to receiving at a first node a particular gossip message containing a first sequence number associated with a second node, determining whether the first sequence number is greater than a second sequence number of the most recently received message from the second node; and responsive to determining that the first sequence number is greater than the second sequence number, transmitting a retransmit command to the second node.

14. The computer program product of claim 8, wherein the program instructions for first transmitting transmit gossip messages containing indications of operational status for nodes having an operational status set as operating at the nodes originating the gossip messages.

* * * * *